July 25, 1950   H. W. WOODARD   2,516,609
FORMING SMALL OPENINGS IN A THICK RUBBER SHEET
Filed Oct. 27, 1949

Inventor
Harry W. Woodard
By
Atty

Patented July 25, 1950

2,516,609

UNITED STATES PATENT OFFICE 2,516,609

FORMING SMALL OPENINGS IN A THICK RUBBER SHEET

Harry W. Woodard, Akron, Ohio, assignor to The B. F. Goodrich Company, New York, N. Y., a corporation of New York Application October 27, 1949, Serial No. 123,870

2 Claims. (Cl. 219—19)

This invention relates to forming small apertures in a thick sheet of resilient vulcanized rubber or other rubber-like material and is especially useful where the thickness of the sheet of material is many times the diameter of the desired aperture and it is desired to form the aperture entirely through the sheet.

The forming of small apertures through a thick sheet of resilient vulcanized rubber has heretofore presented great difficulties especially when the thickness of the sheet was on the order of ten or more times the diameter of the desired apertures. Attempts to form such apertures with rotatable drills have been found unsatisfactory in that the resilient material is deformed under pressure of the drill, any aperture so formed is consequently of a size smaller than the drill, lubrication of the drill is extremely difficult, and the resulting bore is rough, whereas the high friction rapidly wears and heats up the drill. Where it is attempted to use twist drills, the drill is drawn too rapidly into the material and the drillings form a solid rope of the material which clogs the flutes of the drill.

It has been proposed to burn such apertures through the sheet by means of a heated needle, but the needle rapidly cools by contact with the rubber or other rubber-like material below the temperature necessary for burning. As the thickness of the sheet is increased, the difficulty is increased.

The present invention aims to overcome the foregoing and other difficulties and has for an object to form smooth-bored apertures of small size through a thick sheet of rubber-like material.

Other objects are to form bores of any desired shape, and to provide uniformity of size of a bore relative to another and also throughout a bore.

These and other objects will appear from the following description and the accompanying drawings.

Figure 1:
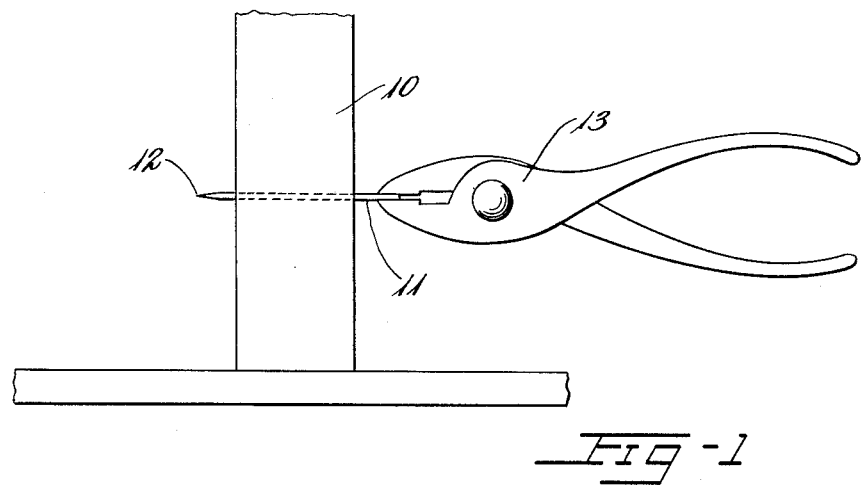
Fig. 1 is a view showing the first step of the procedure of the invention.
Figure 2:
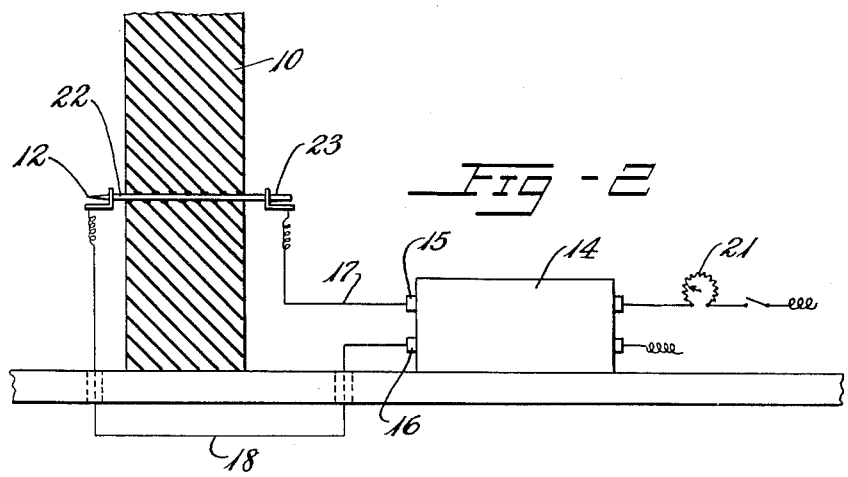
Fig. 2 is a sectional view showing the second step of the procedure.
Figure 3:
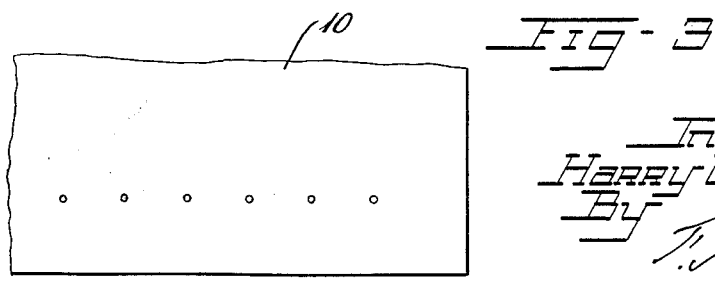
Fig. 3 is a face view of the perforated sheet.

Referring to the drawings, the numeral 10 designates a thick sheet of resilient vulcanized rubber or other rubber-like material. The numeral 11 designates a needle having a sharp point 12 at one end thereof. As shown in the drawing the needle 11 is held by a pair of pliers 13 and is forced thereby through the sheet 10.

Should the needle 11 be withdrawn, the aperture formed by thrusting the needle through the sheet of rubber-like material would substantially close due to resilience of the rubber-like material.

To prevent closing of the aperture upon withdrawal of the needle, the needle 11 is inserted in the output circuit of a transformer 14, the secondary terminals 15, 16 of which are connected to the respective protruding ends 22, 23 of the needle 11 by wires 17, 18 and the primary wires 19, 20 of which are connected to a source of electric current (not shown). As the needle 11 has resistance to passage of electric current, it is heated thereby to a temperature sufficiently high to soften and permanently displace, and if desired even to burn the rubber-like material thereabout to a size of the hole at least equal to the needle. The wires 17, 18 may then be disconnected and the needle withdrawn. By means of a rheostat 21 in the power line, the current supplied to the needle and therefore the temperature to which the needle is raised, may be controlled. By control of temperature and time of application, the size of the aperture may be nicely controlled.

As an example of use of the invention where apertures were to be formed through a sheet of soft vulcanized rubber three-fourths of an inch thick, a steel needle measuring 34 one-thousandths of an inch was employed and current was supplied from the secondary of a transformer operating on a 110 volt circuit and delivering a current of eight amperes at ten volts. Smooth apertures closely conforming to the diameter of the needle were obtained without difficulty.

The apparatus is not confined to the making of round apertures as by employing needles of different cross section, apertures of oval, polygonal or other cross section may be formed.

As the needle is inserted when cold and then heated, the cold needle may be accurately positioned in the work before the heat is applied. Due to the passage of current through the needle from end to end between the positions of connection, apertures of considerable lengths may be formed in rubber or other rubber-like material.

Variations may be made without departing from the scope of the invention as it is defined by the following claims.

I claim:

1. The method of forming an aperture of small bore through a body of vulcanized rubber having a thickness at least ten times the diameter of the bore which comprises forcing a stiff sharp pointed elongate electrically conductive instrument having the cross-sectional shape and approximate size of the desired aperture through the rubber body to a position where the ends of the instrument protrude beyond said body, connecting the protruding portions of the instrument at positions between said ends in an electric circuit, heating the instrument between the connections by passing an electric current therethrough to soften and permanently displace rubber material about the instrument, disconnecting the instrument from the electric circuit and withdrawing the instrument.

2. The method of forming an aperture of small bore through a body of vulcanized rubber material having a thickness at least ten times the diameter of the bore which comprises forcing a sharp pointed electrically conductive needle having the cross-sectional shape and approximate size of the desired aperture through the rubber body to a position where the ends of the needle protrude beyond said body, attaching conductors to the protruding portions of the needle at positions remote from its ends to complete an electrical circuit thereto, heating the needle by passing an electric circuit therethrough to soften and permanently displace rubber material about the needle, disconnecting the needle from the electric circuit, and withdrawing the needle.

HARRY W. WOODARD.

REFERENCES CITED

The following references are of record in the file of this patent:

UNITED STATES PATENTS

| Number | Name | Date |
|---|---|---|
| 1,934,780 | Van Halteren | Nov. 14, 1933 |
| 2,374,706 | Saslaw | May 1, 1945 |
| 2,386,409 | Saffady | Oct. 9, 1945 |
| 2,477,040 | Brown et al. | July 26, 1949 |